United States Patent [19]
Phillips

[11] 3,870,276
[45] Mar. 11, 1975

[54] STABILIZING JACK

[75] Inventor: David P. Phillips, Lookout Mountain, Tenn.

[73] Assignee: Wildwood Products, Inc., Lookout Mountain, Tenn.

[22] Filed: Sept. 24, 1973

[21] Appl. No.: 399,856

Related U.S. Application Data

[63] Continuation-in-part of Ser. No. 281,459, Aug. 17, 1972, abandoned.

[52] U.S. Cl. ............................ 254/86 R, 280/150.5
[51] Int. Cl. ............................................ B60s 9/02
[58] Field of Search ........... 254/45, 86 R; 280/150.5

[56] References Cited
UNITED STATES PATENTS

| | | | |
|---|---|---|---|
| 1,669,410 | 5/1928 | Calestini | 254/86 R |
| 3,656,778 | 4/1972 | Bristol | 280/150.5 |
| 3,690,694 | 9/1972 | Herndon | 280/150.5 |
| 3,709,518 | 1/1973 | Gauchet | 280/150.5 |
| 3,784,160 | 1/1974 | Phillips | 254/86 R |

*Primary Examiner*—Al Lawrence Smith
*Assistant Examiner*—Robert C. Watson
*Attorney, Agent, or Firm*—McGarry & Waters

[57] ABSTRACT

A stabilizing jack for mounting beneath a recreational vehicle such as a trailer or self-contained motorized unit, the jack having a pair of legs pivotably mounted beneath the vehicle and extending in opposite directions from each other when retained in a normal horizontal position. The legs are moved downwardly into a stabilizing position beneath the vehicle with an equal force on both of the legs so that both of the legs strike the ground before further force is applied to either leg as, for example, when the vehicle is stabilized on uneven terrain. The upper parts of the legs are mounted for sliding movement within a housing and a cylinder connected to the upper portions and movably mounted therebetween forces the leg upper portions apart so that the lower portions of the legs extend downwardly to the ground. The jack can be used to raise the vehicle off its suspension as well as stabilize the vehicle.

5 Claims, 5 Drawing Figures

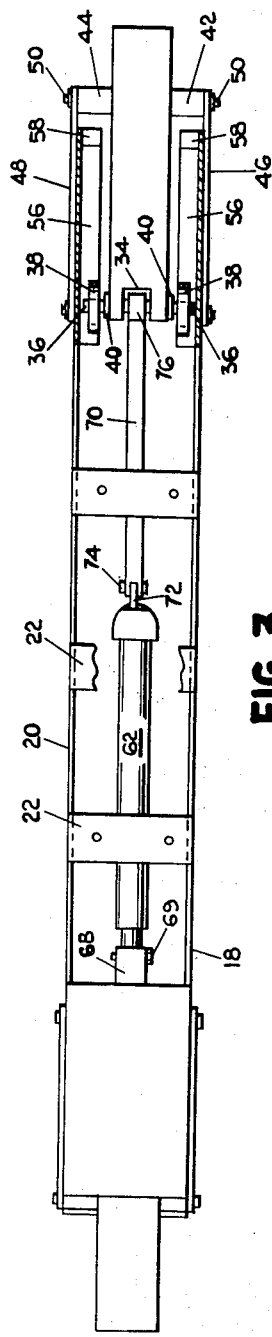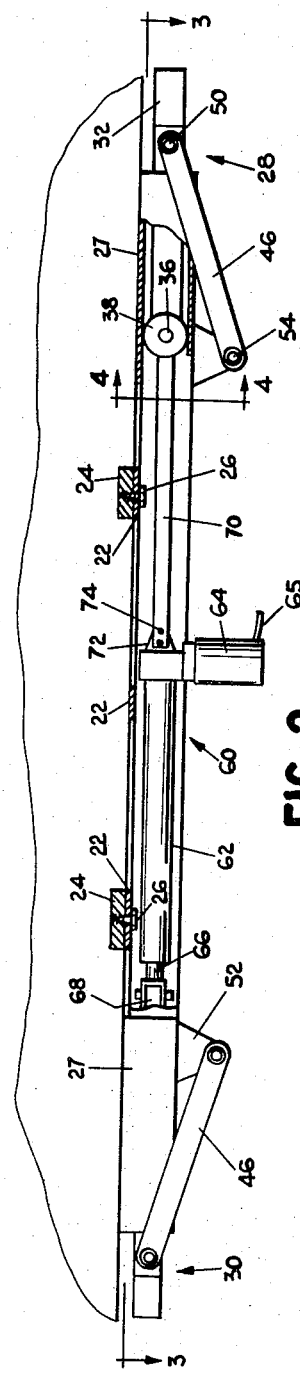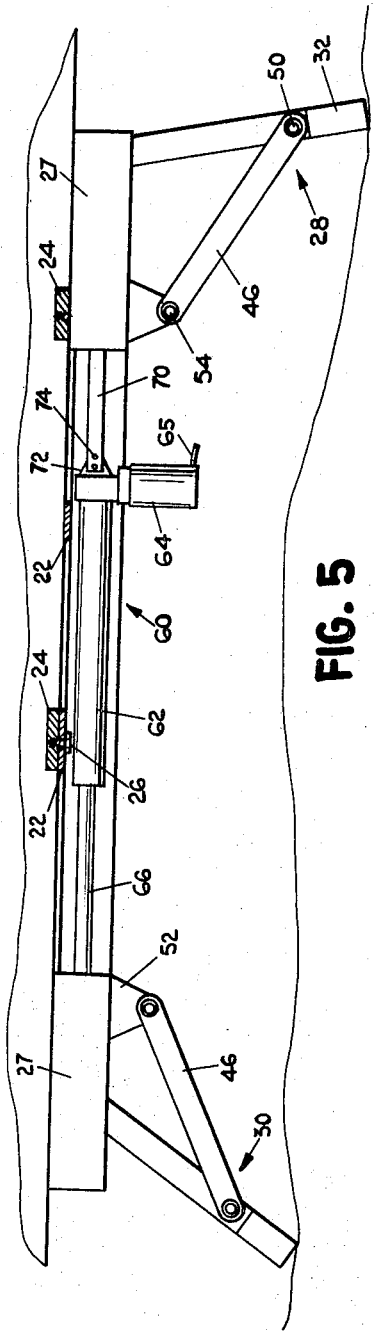

STABILIZING JACK

CROSS-REFERENCE TO RELATED APPLICATION

This application is a continuation-in-part of my copending application Ser. No. 281,459, filled Aug. 17, 1972, now abandoned.

BACKGROUND OF THE INVENTION

1. Field of the Invention

This invention relates to stabilizing assemblies for recreational vehicles such as travel trailers and self-contained recreational vehicles. In one of its aspects, the invention relates to a stabilizing jack having two pivotably mounted legs wherein force is applied equally to each of the legs to stabilize the vehicle in a horizontal position on even or uneven ground.

2. State of the Prior Art

Recreational vehicles, such as trailers and self-contained travel units, are required to be stabilized when they are parked and used for normal camping purposes. The vehicles have springs which cushion the ride, but make the vehicle wobbly when the vehicle is parked and in use. Further, appliances such as refrigerators, now common in many recreational travel vehicles, are required to be maintained in a level position in order to operate properly. Jacks are commonly used to stabilize the vehicle at two or four corners therof. Many different types of jacks have been heretofore used for this purpose. One common type is the jack stand which has a base and an extendable threaded rod. The rod is rotated to move the rod upwardly to contact a corner of the vehicle. Normally, one jack stand is used at each corner of the vehicle.

Other types of jacks are mounted on the vehicle itself. In some cases, the jacks are pivotably mounted on the vehicle for movement between a horizontal position and a substantially vertical position. When the jack reaches the vertical position, the legs are extended by a variety of means to contact the ground. An example of such a jack is disclosed in U.S. Pat. No. 3,589,748. to Miller. In this jack, hydraulic pods are employed to lower the legs and lift the vehicle.

Another stabilizing system for travel vehicles is disclosed in the United States Patent to Taylor, U.S. Pat. No. 3,457,008. In this system, support legs are pivotably mounted beneath a vehicle and are braced in depending position by cross brace members extending from the top of one leg to the bottom of the other leg. Each cross brace member must be separately operated to tighten the legs into a firm stabilizing position.

Another hydraulic stabilizing system is disclosed by Harris in U.S. Pat. No. 2,048,264. In the Harris system, separate legs are lowered to the ground by means of hydraulic pressure operating on opposing drive pistons. The legs are pivotably mounted and are rotatably driven by racks which are driven by the pistons.

Hydraulic systems for stabilizing jacks are expensive, cumbersome, and involve a number of elements such as a closed fluid system including fluid tight seals, conduits, pumps, compressors, and regulating devices. The systems are subject to leaks and damage which would completely destroy the effectiveness of the jack.

Bristol 3,656,778 656 778 discloses still another type of leveling and stabilizing means for trailer vehicles. In the Bristol system, struts on the vehicle are pivotably mounted to the vehicle and a brace is pivotably mounted at one end of each strut. Each brace has a free end which engages one of a series of abutments along the bottom of the vehicle. A spring is secured between the braces to bias the free ends of the braces upwardly and inwardly. The struts will fall down by gravity but must be raised manually. Further, there is no means for actually raising the vehicle from its normal suspension system.

Still another form of a stabilizing jack is disclosed by Hernden in U.S. Pat. No. 3,690,694. The Hernden system employs extendible struts pivotably mounted to the vehicle and pulled together by a spring toggle mechanism.

Many other jack systems have been devised for automobiles and the like. In such systems, pivotably mounted jacks are driven by a single drive mechanism simultaneously to lift the vehicle off the ground. Examples of such jacks are disclosed in U.S. Pat. Nos. to Meyer, 1,426,310 and Wenzel, 2,036,006. However, such jacks are designed to operate under flat or horizontal terrain such as would be found on a road surface. The legs are driven through an equal distance to raise the vehicle. If the ground is not flat and horizontal as is more than likely the case in areas where travel vehicles are parked, then the vehicle is not stabilized horizontally and evenly.

SUMMARY OF THE INVENTION

According to the invention, a jace is provided beneath a recreational vehicle to stabilize the same. The jack has first and second legs pivotably mounted in spaced relationship on a housing for movement between a substantially horizontal position to a depending position. Means are provided to simultaneously apply an equal force to each of the legs to lower the legs into a ground engaging position. Thus, in the event that one leg strikes the ground before the other, the other leg will continue to move until it strikes the ground and then both legs will be driven further down with an equal force. The upper ends of the legs are mounted, preferably on rollers, for movement by a freely suspended mechanical linkage which is secured between the upper ends of the legs. The mechanical linkage comprises a screw type of actuator which forces the upper ends of the legs outwardly to lower the legs and forces the upper ends of the legs inwardly to raise the legs. The linkage can be used to raise the vehicle off its suspension as well as to stabilize the vehicle.

BRIEF DESCRIPTION OF THE DRAWINGS

The invention will now be described with reference to the accompanying drawings in which:

FIG. 2 is a side elevational view of one of the stabilizer assemblies illustrated in FIG. 1 with both of the legs retracted;

FIG. 3 is a top plan view of the stabilizer assembly taken along lines 3—3 of FIG. 2;

FIG. 5 is a view similar to FIG. 2 showing the legs in the lowered position.

DESCRIPTION OF THE PREFERRED EMBODIMENT

Figure 1:
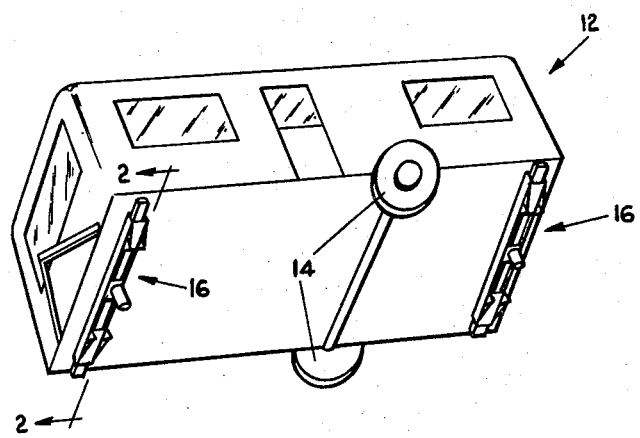
FIG. 1 is a perspective view of the underside of a travel vehicle illustrating one embodiment of the invention.
Figure 4:
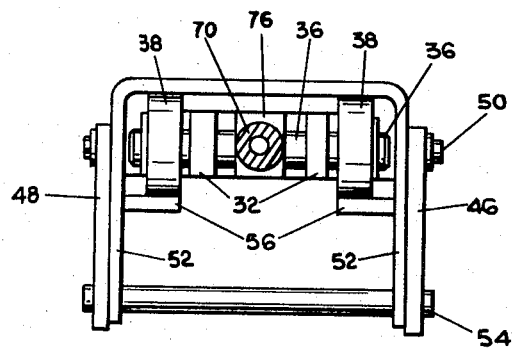
FIG. 4 is a partial sectional view seen along lines 4—4 of FIG. 2.

Referring now to the drawings, there is shown in FIG.

1 a perspective view of the underside of a travel vehicle 12 having a pair of wheels 14 and stabilizing assemblies 16 at front and rear portions of the vehicle.

The stabilizer assembly 16 has a pair of side plates 18 and 20 connected by cross plates 22. The stabilizer assembly is secured to the vehicle by bolts 26 which extend through the cross plates 22 and into vehicle frame members 24. Leg housings 27 are provided at either end of the side plates 18 and 20 and house a right leg assembly 28 at one end and a left leg assembly 30 at the other end.

The right and left leg assemblies are identical and, for the sake of brevity, only one such leg assembly will be described in detail. The leg assemblies have an elongated rectangular tube 32 with a square cut out portion 34 at the inner end. A shaft 36 extends through the inner end of the tube 32 and through the opening 34. A pair of wheels 38 are mounted on the shaft 36 adjacent the sides of the tube 32. The wheels 38 are separated from the tube 32 by bearings 40 and are retained on the shaft by conventional means such as cotter pins and washers (not shown). A pair of journals 42 and 44 extend outwardly near the outer end of the tube 32 and transverse to the axis thereof. Arms 46 and 48 are pivotably mounted on the journals 42 and 44 respectively through pins 50. Depending brackets 52 extend down from the sides of the leg housings 27 and pivotably retain at the bottom portion thereof the other end of the arms 46 and 48 through a pin 54. The arms 46 and 48 are retained on the pins 50 and 54 through conventional retaining means (not shown).

Rail plates 56 extend inwardly from a bottom portion of the leg housings 27 to form rails for the wheels 38. Stop blocks 58 are provided on the outer ends of the rail plate 56 to limit the movement of the wheels 38 within the leg housings 27.

The wheels 38 are free to rotate about the shaft 36, preferably with the assistance of convential wheel bearings, with the wheels 38 riding on the underside of the leg housings and on top of the rail plates 56.

An actuator 60 is suspended between the leg assemblies 28 and 30 to control the movement thereof. The actuator 60 is desirably a mechanical actuator having a cylinder 62, an electric motor 64 having current supplied thereto by an electrical cord 64 and an extendable rod 66. Such actuators are well known. Example of a suitable actuator is the Duff-Norton MINIPAC MECHANICAL ACTUATOR sold by the Duff-Norton Company, Inc., P.O. Box 1719, Charlotte, N.C. 28201.

In this type of actuator, the motor 64 drives a screw (not shown) within the cylinder 62. The extendable rod 66 threadably engages the screw and is moved by rotation of the screw. The extendable rod 66 is secured to the inner end of the left leg assembly 30 through a left extension bracket 68 and a bolt 69. The other end of the actuator 60 is secured to a right extension bracket 70 through a flange 72 on the end of the cylinder 62 and a bolt 74. A collar 76 is provided on the other end of the right extension bracket 70 for rotationally coupling the bracket 70 to the right leg assembly 30. To this end, the shaft 36 extends through the collar 76 and the collar is free to rotate about the shaft. Desirably, bearings (not shown) are provided between the collar 76 and the shaft 36.

In operation, the right and left leg assemblies 38 and 40 are normally in the position illustrated in FIG. 2 during normal operation of the vehicle. When the vehicle is parked and it is desirable to stabilize the same, the vehicle is levelled in the usual way by driving the wheels onto boards, etc., in the event that the terrain is uneven. Power is supplied to the actuator to extend the rod 66 which drives both of the legs assemblies 28 and 30 downwardly. Conceivably, one leg assembly may even be driven downwardly faster than the other. In any case, due to the free mounting of the actuator 60, equal force is applied to the two leg assemblies. As the leg assemblies move downwardly, the wheels 38 will be driven toward the outer end of the leg housing 27 with the rectangular tube 32 pivoting at pin 50 about pin 54. Each leg housing will continue to pivot until such time as the bottom of the tube 32 strikes the ground. If one leg strikes the ground before the other, it will stop movement, but the other leg will continue to move until it strikes the ground. When both legs strike the ground, the actuator continues to drive the legs downwardly applying an equal force to each of the legs, despite the fact that one leg may be extended down farther than the other. As illustrated in FIG. 5, the right leg assembly 30 has extended downwardly farther than the right leg assembly because of the uneven terrain. However, both of the legs will be forced downwardly with an equal force applied by the actuator 60.

During the movement of the legs, the actuator 60 is free to move within the side plates 18 and 20 so that the force on the legs can be equalized. For example, if the left leg assembly first strikes the ground, the actuator will move to the right as viewed in FIGS. 2 and 5 until the right leg also strikes the ground. After both legs are in contact with the ground, further driving of the actuator 60 will raise the vehicle with respect to the ground.

When it is desirable to raise the legs, the motor 64 is driven in the opposite direction to draw the legs upwardly. Once again, an equal pulling force will be applied to each leg assembly to pull the legs upwardly.

In the embodiments described above, a simple and effective stabilizer for vehicles has been provided. The stabilizer can either be hand powered or powered by mechanical or electrical means, or any combination thereof. For example, a simple rod, oppositely threaded at each end, can be used to actuate the movement of the upper ends of the legs outwardly and inwardly. The threaded rod can be powered either by hand or by a motor. The legs are operated by a single mechanism, but automatically adjust to the terrain of the ground. The legs are set in stabilizing position with equal force at the same time. Both legs are connected by the same force applying means and are moved with equal force in spite of the degree to which either leg might be extended. The device can be coupled to a warning device to make sure that the vehicle is not moved when the legs are in the down position. For example, a microswitch (not shown) can be provided to contact one of the legs in its up position. The microswitch can be coupled to a warning light at a conspicuous place which will go on at any time that the microswitch is not depressed by one of the leg assemblies.

Reasonable variation and modifications are possible within the scope of the foregoing disclosure, the drawings, and the appended claims without departing from the spirit of the invention.

The embodiments of the invention in which an exclusive property of privilege is claimed are defined as follows:

1. A mechanical jack for stabilizing a vehicle with respect to the ground comprising:
   at least two legs spaced apart and movably mounted on the underside of the vehicle, each leg being movable from a raised position, wherein the leg is not in contact with the ground, to a lowered position, wherein the leg is in contact with the ground, the legs comprising upper ends that are mounted on movable rollers and lower ends that are pivotable about the upper ends into and out of contact with the ground;
   elongated leg housing means for each leg mounted in axial transverse alignment on the underside of the vehicle, said leg housing means receiving the rollers and guiding the upper ends of the legs on a linear transverse path along the underside of the vehicle;
   mechanical linkage means interconnecting the upper ends of the legs, said mechanical linkage means being adapted, upon receiving a mechanical driving force, to apply the mechanical driving force to the legs in the form of a horizontal transverse force applied to the upper ends of the legs, so as to cause the upper ends of the legs to move on their rollers inwardly or outwardly in their housings, said mechanical linkage means being further adapted to transmit said mechanical driving force to each leg equally and independently, regardless of the distance traveled by each leg;
   arm means pivotally connecting each leg housing means to each leg at a point spaced apart from the upper end thereof, said arm means holding the lower ends of the legs in a raised position so that the legs are pointed toward the outside edges of the vehicle when the rollers are moved inwardly in their housing;
   said arm means causing the legs to pivot downwardly into contact with the ground when the rollers are moved outwardly in their housing; and
   drive means adapted to apply a mechanical driving force to said mechanical linkage means.

2. A mechanical jack for stabilizing a vehicle comprising;
   a pair of elongated hollow, channel-shaped leg housings, mounted in axial alignment transversely across the underside of the vehicle, each leg housing having a top, depending side walls, and inwardly extending flanges attached to the lower edges of the side walls, said leg housings being mounted on the underside of the vehicle and positioned along a common axis that extends transversely across the vehicle, each housing having an inside and outside end facing inwardly and outwardly, respectively, relative to the sides of the vehicle;
   a leg mounted in each leg housing and being movable from a raised position, wherein the leg is not in contact with the ground, to a lowered position, wherein the leg is in contact with the ground, each leg having an upper end, which is pivotably mounted for transverse linear movement in the leg housing on movable rollers, and a lower end, which extends outwardly toward the outer end of the housing when the leg is in its raised position and is movable to its lowered position by pivotal rotation of the leg downwardly toward the ground;
   mechanical arm means attached to each leg, each arm means having an inward end pivotably attached to the leg housing and an outward end pivotably attached to the leg, said arm means being adapted to cause the lower end of the leg to pivot downwardly into contact with the ground with the outward movement of the upper end of the leg;
   a mechanical actuator suspended between the upper ends of the legs, said actuator comprising;
     an outer hollow cylinder having an open end and a closed end, with the closed end being pivotably attached to the upper end of one leg; and
     an extendable rod having an inner end inside the cylinder and an outer end protruding from the open end of the cylinder and being pivotable attached to the upper end of the other leg;
   screw means within the cylinder adapted to cause the extendable rod to extend or retract in response to a rotational mechanical driving force applied thereto; and
   an electric motor means freely suspended from the actuator and being adapted upon actuation to apply a rotational driving force to the screw means;
   whereby actuation of the electric motor means causes the extendable rod to extend or retract, which in turn causes the legs to be lowered or raised independently and to be forced against the ground with equal force, regardless of variations in ground level below the vehicle.

3. A mechanical jack for stabilizing a vehicle with respect to the ground comprising:
   at least two legs spaced apart and movably mounted on the underside of the vehicle, each leg being movable from a raised position, wherein the leg is not in contact with the ground, to a lowered position, wherein the leg is in contact with the ground, the legs comprising upper ends that are mounted on movable rollers and lower ends that are pivotable about the upper ends into and out of contact with the ground;
   means for guiding the upper ends of the rollers in a linear transverse path along the underside of the vehicle;
   mechanical linkage means interconnecting the upper ends of the legs, said mechanical linkage means being adapted, upon receiving a mechanical driving force, to apply the mechanical driving force to the legs in the form of a horizontal transverse force applied to the upper ends of the legs, so as to cause the upper ends of the legs to move transversely on their rollers in their housings, said mechanical linkage means being further adapted to transmit said mechanical driving force to each leg equally and independently, regardless of the distance traveled by each leg;
   arm means pivotably connecting a point on each leg spaced apart from the upper end thereof to a fixed position with respect to the underside of the housing, said arm means being adapted to cause each arm to pivot about its upper end between its raised and lowered positions as the upper end of the arm is moved along its transverse path on the underside of the vehicle;
   drive means adapted to apply a mechanical driving force to said mechanical linkage means.

4. A mechanical jack as claimed in claim 3 wherein:
   the mechanical linkage comprises:

a cylinder attached at one end to the upper end of one leg and having an extendable rod extending from the other end, said extendable rod having an outer end attached to the upper end of the other leg, said cylinder and extendable rod being freely suspended between the upper ends of the legs of transverse movement with respect to the underside of the vehicle; and screw means interconnecting the extendable rod and the cylinder, said screw means being adapted to receive a rotational driving force and, in response thereto, cause the extendable rod to extend or retract with respect to the end of the cylinder; and the drive means is adapted to deliver a rotational driving force to the screw means and is attached to the screw means so as to be freely movable with the screw means in a transverse direction along the underside of the vehicle.

5. A mechanical jack as claimed in claim 4 wherein the drive means is an electric motor.

* * * * *